(12) United States Patent
El Moumouhi et al.

(10) Patent No.: US 9,749,836 B2
(45) Date of Patent: Aug. 29, 2017

(54) MANAGEMENT OF MOBILITY IN A COMMUNICATION NETWORK AS A FUNCTION OF THE SPEED OF A MOBILE TERMINAL

(71) Applicant: Orange, Paris (FR)

(72) Inventors: Sanaa El Moumouhi, Montrouge (FR); Benoît Radier, Perros Guirec (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/415,718

(22) PCT Filed: Jun. 21, 2013

(86) PCT No.: PCT/FR2013/051460
§ 371 (c)(1),
(2) Date: Jan. 19, 2015

(87) PCT Pub. No.: WO2014/013155
PCT Pub. Date: Jan. 23, 2014

(65) Prior Publication Data
US 2015/0208227 A1    Jul. 23, 2015

(30) Foreign Application Priority Data

Jul. 20, 2012   (FR) ...................... 12 57065

(51) Int. Cl.
*H04W 8/02* (2009.01)
*H04W 48/18* (2009.01)
(Continued)

(52) U.S. Cl.
CPC ............. *H04W 8/02* (2013.01); *H04W 48/16* (2013.01); *H04W 48/18* (2013.01); *H04W 64/00* (2013.01); *H04W 8/20* (2013.01)

(58) Field of Classification Search
None
See application file for complete search history.

(56) References Cited

U.S. PATENT DOCUMENTS 7,043,277 B1    5/2006   Pfister
7,263,076 B1    8/2007   Leibovitz et al.
(Continued)

FOREIGN PATENT DOCUMENTS

EP          2 571 311 A1      3/2013
WO    WO 2011/050835 A1      5/2011
(Continued)

OTHER PUBLICATIONS

"Designing the algorithm for network discovery and selection in heterogeneous radio network environment" by Klimasauskas, dated Dec. 1, 2011.*

(Continued)

*Primary Examiner* — Daniel Lai
(74) *Attorney, Agent, or Firm* — Knobbe Martens Olson & Bear LLP

(57) ABSTRACT

A method of managing mobility of a mobile terminal in a communication network comprising a plurality of access points and an access points discovery server adapted for providing the mobile terminal with a list of the network access points to which the mobile terminal can connect is disclosed. In some embodiments, the method comprises recovery, by the access points discovery server, of a velocity vector of the mobile terminal, and generation, by the access points discovery server, of the list of access points as a function of said velocity vector.

16 Claims, 5 Drawing Sheets

Figure 1:
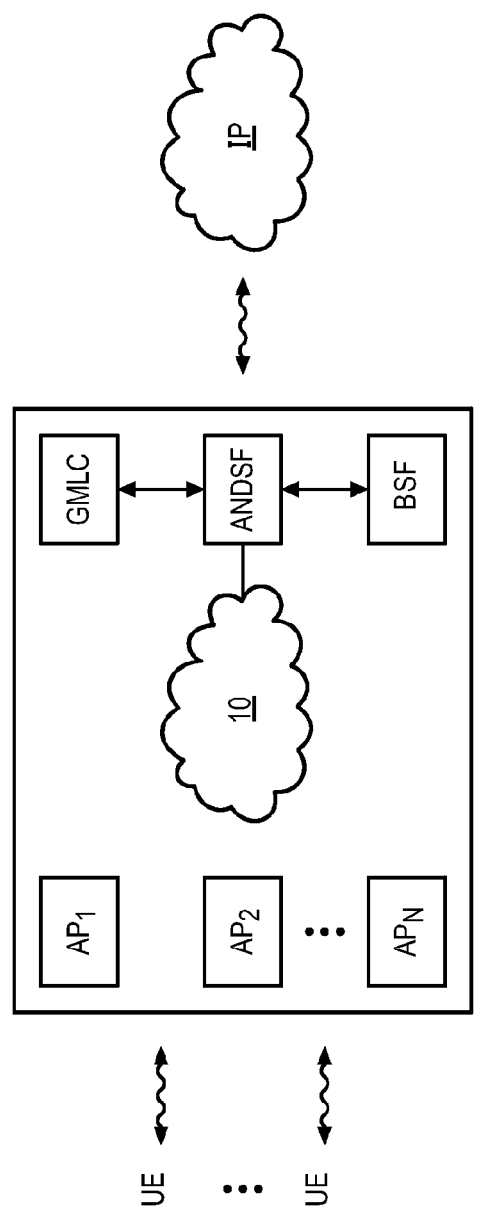

(51) Int. Cl.
H04W 48/16 (2009.01)
H04W 64/00 (2009.01)
H04W 8/20 (2009.01)

(56) References Cited

U.S. PATENT DOCUMENTS

| | | | |
|---|---|---|---|
| 7,483,995 B2 | 1/2009 | Abhishek et al. | |
| 8,160,611 B1* | 4/2012 | Oroskar | H04W 48/04 455/403 |
| 9,215,335 B1 | 12/2015 | Nas et al. | |
| 2002/0075844 A1 | 6/2002 | Hagen | |
| 2002/0183038 A1 | 12/2002 | Comstock et al. | |
| 2003/0134615 A1 | 7/2003 | Takeuchi | |
| 2003/0140256 A1 | 7/2003 | Hauenstein et al. | |
| 2004/0121774 A1* | 6/2004 | Rajkotia | H04W 36/32 455/441 |
| 2004/0156372 A1 | 8/2004 | Hussa | |
| 2005/0003827 A1 | 1/2005 | Whelan | |
| 2005/0003829 A1* | 1/2005 | Lala | G01S 11/02 455/456.1 |
| 2005/0270998 A1 | 12/2005 | Rambo et al. | |
| 2007/0033139 A1 | 2/2007 | Handler | |
| 2007/0072584 A1 | 3/2007 | Jain et al. | |
| 2008/0032738 A1 | 2/2008 | Boyer et al. | |
| 2009/0047948 A1* | 2/2009 | Turetsky | H04W 48/20 455/432.1 |
| 2009/0048915 A1 | 2/2009 | Chan | |
| 2009/0221287 A1 | 9/2009 | Balasubramanian et al. | |
| 2009/0239576 A1 | 9/2009 | Liao et al. | |
| 2009/0245176 A1 | 10/2009 | Balasubramanian et al. | |
| 2012/0064856 A1 | 3/2012 | Nandal | |
| 2012/0122515 A1* | 5/2012 | Han | H04W 36/32 455/525 |
| 2013/0143542 A1 | 6/2013 | Kovvali et al. | |
| 2013/0155849 A1 | 6/2013 | Koodli et al. | |
| 2013/0208696 A1* | 8/2013 | Garcia Martin | H04W 36/32 370/331 |
| 2013/0272285 A1 | 10/2013 | Goldsmith et al. | |
| 2014/0080539 A1 | 3/2014 | Scherzer et al. | |
| 2014/0204903 A1 | 7/2014 | Kim et al. | |
| 2014/0206349 A1 | 7/2014 | Bertrand et al. | |
| 2014/0315536 A1 | 10/2014 | Chow et al. | |
| 2015/0181407 A1 | 6/2015 | Moumouhi et al. | |
| 2015/0215850 A1 | 7/2015 | Moumouhi et al. | |
| 2016/0057674 A1* | 2/2016 | Takeda | H04W 48/20 370/332 |

FOREIGN PATENT DOCUMENTS

| | | |
|---|---|---|
| WO | WO 2011/147465 A1 | 12/2011 |
| WO | WO 2012/149954 A1 | 11/2012 |
| WO | WO 2014/013156 A1 | 1/2014 |
| WO | WO 2014/013196 A1 | 1/2014 |

OTHER PUBLICATIONS

Office Action dated Aug. 27, 2015 for U.S. Publication No. 2015/0181407 filed Jan. 19, 2015.
Office Action dated Oct. 23, 2015 for U.S. Publication No. 2015/0215850 filed Jan. 19, 2015.
U.S. Office Action dated May 19, 2016 in co-pending U.S. Appl. No. 14/415,716.
U.S. Office Action dated Jun. 7, 2016 in co-pending U.S. Appl. No. 14/415,720.
3GPP TS 33.228 v9.1.0 (Jun. 2010) 3rd Generation Partnership Project; Technical Specification Group Services and System Aspects; Generic Authentication Architecture (GAA); Access to network application functions using Hypertext Transfer Protocol over Transport Layer Security (HTTPS) (Release 9), 22 pp., Jun. 2010.
3GPP TS 23.402 v11.3.0 (Jun. 2012), 3rd Generation Partnership Project; Technical Specification Group Services and Systems Aspects; Architecture enhancements for non-3GPP accesses (Release 11), Jun. 2012, 252 pp.
3GPP TS 32.299 v11.4.0 (Jun. 2012) 3rd Generation Partnership Project; Technical Specification Group Services and System Aspects; Telecommunication management; Charging management; Diameter charging applications (Release 11), 151 pp. Jun. 2012.
3GPP TS 23.060 v11.2.0 (Jun. 2012), 3rd Generation Partnership Project; Technical Specification Group Services and System Aspects; General Packet Radio Service (GPRS); Services description; Stage 2 (Release 11), 335 pp. Jun. 2012.
3GPP TS 24.302 V.11.3.0 (Jun. 2012) 3rd Generation Partnership Project; Technical Specification Group Core Network and Terminals; Access to the 3GPP Evolved Packet Core (EPC) via non-3GPP access networks: Stage 3 (Release 11), 60 pp. Jun. 2012.
3GPP TS 24.312 V11.3.0 (Jun. 2012) 3rd Generation Partnership Project; Technical Specification Group Core Network and Terminals; Access Network Discovery and Selection Function (ANDSF) Management Object (MO) (Release 11), 162 pp. Jun. 2012.
Corici, et al. Enhanced access network discovery and selection in 3GPP evolved packet core. *3rd IEEE LCN Workshop on User Mobility and Vehicular Networks (ON-MOVE 2009)*, Zurich, Switzerland, Oct. 20-23, 2009, pp. 677-682.
Ericsson, et al. Aug. 24, 2010. QoS for a 3GPP UE in BBF. 3GPP Draft; S2-103647_QOS_3GPP_UE_BBF, 3rd Generation Partnership Project (3GPP), Mobile Competence Centre; 650, Route des Lucioles, F-06921 Sophia-Antipolis Cedex, France, vol. SA WG2, No. Brunstad; Sep. 3, 2010, 19 pp.
Tervonen, J. Dec. 22, 2010. Deliverable DA2.2.23 Policy and Charging Control Functionality with WLAN and PBRM. Retrieved from the Internet on May 2, 2013: URL:http://www.futureinternet.fi/publications/ICT_SHOK_FI_Phase2_DA2.2.23_10.pdf. 25 pages.
Tervonen, J. Jun. 30, 2010. Deliverable DA2.2.22 Offloading Traffic from Cellular Networks with PBRM. Retrieved from the Internet on Oct. 19, 2011: URL:http://www.futureinternet.fi/publications/ICT_SHOK_FI_Phase2_DA2.2.22_10-1.pdf. 39 pages.
Preliminary Search Report dated Apr. 12, 2013 in French patent application No. 1257065, 2 pp.
International Search Report dated Sep. 24, 2013 for International Application No. PCT/FR2013/051460 filed Jun. 21, 2013, 7 p.
Preliminary Search Report dated Apr. 12, 2013 in French patent application No. 1257055, 2 pp.
International Search Report dated Sep. 24, 2013 for International Application No. PCT/FR2013/051461 filed Jun. 21, 2013, 7 pp.
Preliminary Search Report dated May 15, 2013 in French patent application No. 1257050, 4 pp.
International Search Report dated Sep. 24, 2013 for International Application No. PCT/FR2013/051719 filed Jul. 17, 2013, 7 pp.
U.S. Appl. No. 14/415,720 as filed, filed Jan. 19, 2015, 18 pp.
Preliminary Amendment dated Jan. 19, 2015 in U.S. Appl. No. 14/415,720, 8 pp.
U.S. Appl. No. 14/415,716 as filed, filed Jan. 19, 2015, 20 pp.
Preliminary Amendment dated Jan. 19, 2015 in U.S. Appl. No. 14/415,716, 8 pp.
Amendment and Response dated Nov. 12, 2015 in U.S. Appl. No. 14/415,720, filed Jan. 19, 2015.
Office Action dated Feb. 18, 2016 in U.S. Appl. No. 14/415,720, filed Jan. 19, 2015.
Amendment and Response dated Jan. 21, 2016 in U.S. Appl. No. 14/415,716, filed Jan. 19, 2015.
U.S. Office Action dated Dec. 7, 2016 in co-pending U.S. Appl. No. 14/415,720.
Applicant Response after Final dated May 17, 2016 for U.S. Appl. No. 14/415,720, filed Jan. 19, 2015.
Amendment and Response dated Sep. 7, 2016 in U.S. Appl. No. 14/415,720, filed Jan. 19, 2015.
Rce and Response after Final dated Sep. 19, 2016 in U.S. Appl. No. 14/415,716, filed Jan. 19, 2015.
Notice of Allowance dated Nov. 1, 2016 in U.S. Appl. No. 14/415,716, filed Jan. 19, 2015.
Amendment/RCE after Final dated Apr. 7, 2017 in U.S. Appl. No. 14/415,720, filed Jan. 19, 2015.

(56) References Cited

OTHER PUBLICATIONS

RCE/IDS after Allowance dated Jan. 31, 2017 in U.S. Appl. No. 14/415,716, filed Jan. 19, 2015.
Supplemental Response dated May 1, 2017 in U.S. Appl. No. 14/415,716, filed Jan. 19, 2015.

* cited by examiner

MANAGEMENT OF MOBILITY IN A COMMUNICATION NETWORK AS A FUNCTION OF THE SPEED OF A MOBILE TERMINAL

RELATED APPLICATIONS

This application is the U.S. National Phase of Application No. PCT/FR2013/051460 entitled "MANAGEMENT OF MOBILITY IN A COMMUNICATION NETWORK AS A FUNCTION OF THE SPEED OF A MOBILE TERMINAL" filed Jun. 21, 2013, which designated the United States, and which claims the benefit of French Application No. 1257065 filed Jul. 20, 2012.

GENERAL TECHNICAL FIELD

The invention relates to the field of cellular communications, and more particularly the management of mobility between 3GPP and non-3GPP access networks such as specified by the standard 3GPP, in particular in the technical specifications TS 24.302 and TS 24.312.

STATE OF THE ART

When a user of a mobile communications terminal is subscribed to a telecommunications operator, this telecommunications operator allows the user to connect to a communications network by means of his mobile terminal, enabling taking out a subscription to then access several types of services originating from one IP (Internet Protocol) network, such as the Internet network.

When this network is a 3GPP cellular network (for example, Edge, 3G, 3G+, 4G, LTE) it comprises a network core, as well as a 3GPP access network. The 3GPP access network comprises a set of 3GPP access points by which the terminal connects.

In addition to the 3GPP access network, the operator can provide its subscribers with non-3GPP access points (designated by the term "hot spot") to increase coverage and capacity of the 3GPP access network.

The communications terminal can provide mobility or movement from a 3GPP access network to a non-3GPP network, and vice versa.

In the 3GPP standard, especially in specifications TS 24.302 and TS 24.312, an access point discovery server (Access Network Discovery and Selection Function, (ANDSF)) is provided. In particular, on request from a moving mobile terminal, this ANDSF server supplies a list of access points near the position of the mobile terminal. The access points relate to non-3GPP access networks (for example Wi-Fi, Wimax) and/or 3GPP access networks (for example Edge, 3G, 3G+, 4G, LTE).

In addition, this ANDSF server comprises a database comprising information on the topology of access networks and information on rules for selecting an access network, especially rules of a telecommunications operator, enabling ordering the list of types of access and access points which the terminal can preferably use.

To receive the list, the terminal sends a request to the ANDSF server so that in case of a change in position of the mobile terminal or in case of degradation of the quality of the radio link, the terminal can retrieve the list of available access points near the mobile terminal.

The mobile terminal stores in memory a list of access points to which it can connect, prepared by the ANDSF server, then moves to an access network of the list, if necessary by making use of this list of access points.

This list of access points is in the form of an ordered list of access points near the mobile terminal, optionally classified by types of access network (3G, 4G, Wifi, Wimax).

But mobility management currently deployed by the ANDSF server is based on preferences of the operator or of the user only. As a function of the degree of movement and velocity of the mobile terminal, some access points cannot be adapted to the quality of experience necessary for the user.

PRESENTATION OF THE INVENTION

The invention relates to movement of the mobile terminal and proposes, according to a first aspect, a mobility management method of a mobile terminal in a communications network comprising a plurality of access points and an access point discovery server adapted to supply the mobile terminal a list of the access points of the network to which the mobile terminal can connect, the method comprising the following steps: retrieval by the access point discovery server of a velocity vector of the mobile terminal; and generation by the access point discovery server of the list of the access points as a function of said velocity vector.

The method of the invention is advantageously completed by the following characteristics, taken singly or in any of their technically possible combinations:

- the velocity vector is retrieved from a location management gateway and sent by said gateway to the access point discovery server, following receipt by the location management gateway of a request for retrieval sent by the access point discovery server;
- at least part of the velocity vector is obtained by the location management gateway from a location server capable of locating the mobile terminal in the communications network;
- the velocity vector is determined by the mobile terminal by means of a geolocation module of the mobile terminal and transmitted via said mobile terminal to the access point discovery server;
- the velocity vector comprises a velocity component of the mobile terminal, the access point discovery server generating the list of access points as a function of said velocity component of the mobile terminal;
- thresholds of maximal velocity are associated respectively with said access points as a function of their belonging to a category of access point, the access point associated with a maximal velocity threshold less than the velocity component of the mobile terminal being excluded from the list generated by the access point discovery server;
- the velocity vector comprises an acceleration component of the mobile terminal, the access point discovery server generating the list of access points as a function of said acceleration component of the mobile terminal;
- the velocity vector comprises a displacement component, the access point discovery server generating the list of access points as a function of said displacement component;
- it further comprises sending of the list of access points to the mobile terminal and the storing of said list in a memory of the mobile terminal;
- the access point discovery server, respectively the location management gateway, is an ANDSF server, respectively a GMLC gateway, according to the standard 3GPP.

According to a second aspect, the invention relates to an access point discovery server capable of transmitting to a mobile terminal a list of access points of a communications network to which the mobile terminal can connect, said server being configured to obtain a velocity vector of the mobile terminal and generate the list of access points as a function of said velocity vector.

According to a third aspect, the invention relates to a mobile location gateway capable of determining a velocity vector of a mobile terminal and configured, on receipt of a request for retrieval of the velocity vector originating from an access point discovery server, to send a message comprising the velocity vector to said access point discovery server.

According to a fourth aspect, the invention relates to a mobile location gateway capable of determining a velocity vector of a mobile terminal and configured, in the event of change in velocity of a mobile terminal, to send a message comprising the velocity vector to said access point discovery server.

According to a fifth aspect, the invention relates to a mobile terminal comprising a selection module of an access point of a communications network, this selection module being configured to select the access point in a list of access points received from an access point discovery server of the communications network, this list of access points being generated as a function of a velocity vector of the mobile terminal retrieved by the access point discovery server.

In a particular embodiment, the mobile terminal further comprises a geolocation module configured to determine the velocity vector of the mobile terminal and an emission module configured to transmit this velocity vector to the access point discovery server.

According to a sixth aspect, the invention relates to a mobility management system of a mobile terminal comprising an access point discovery server, adapted to supply a mobile terminal with a list of access points of a communications network to which the mobile terminal can connect, and a mobile location gateway capable of determining a velocity vector of the mobile terminal. Advantageously, the mobile location gateway is configured to send a message comprising the velocity vector to the access point discovery server, following receipt of a request for retrieval of the velocity vector coming from the access point discovery server and the access point discovery server is configured to generate the list of access points as a function of the velocity vector received of the mobile location gateway.

According to a seventh aspect, the invention relates to a computer program product comprising code instructions for execution of a method according to the first aspect of the invention, when the latter is executed by a processor.

Given all or some of the velocity parameters of the mobile terminal during preparation of the list of access points supplied to the mobile terminal, movement of a mobile terminal of an access network to another access is optimised.

PRESENTATION OF FIGURES

Figure 2:
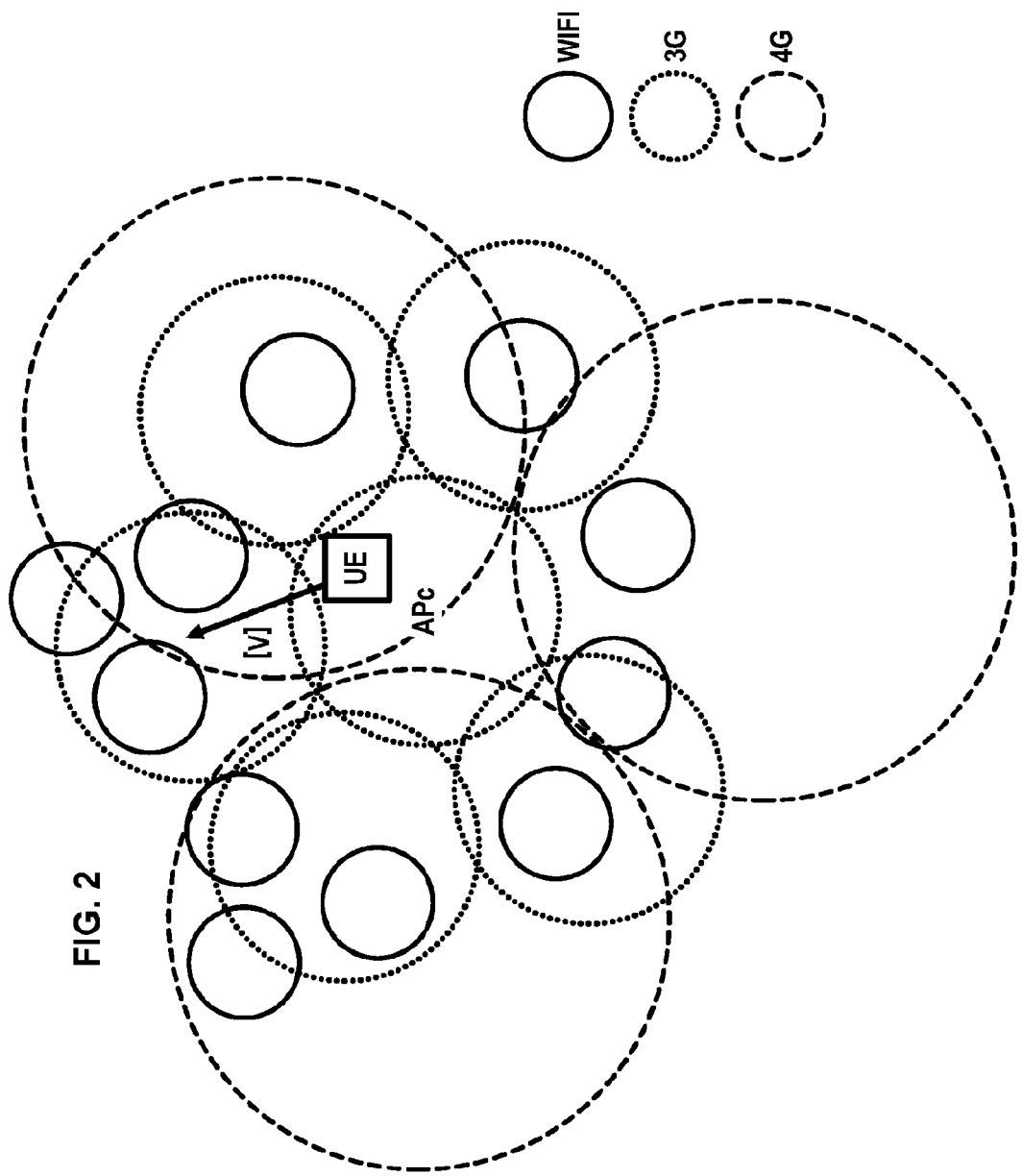
Figure 3:
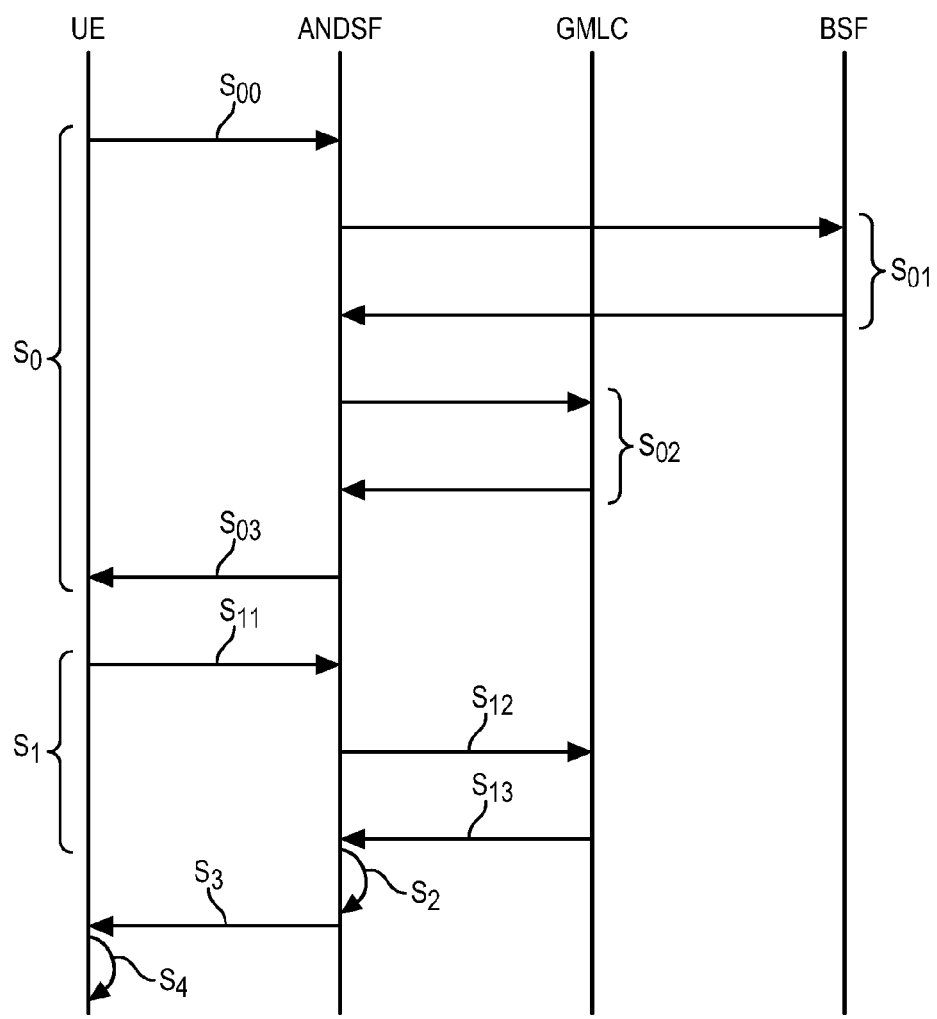
Figure 4A:
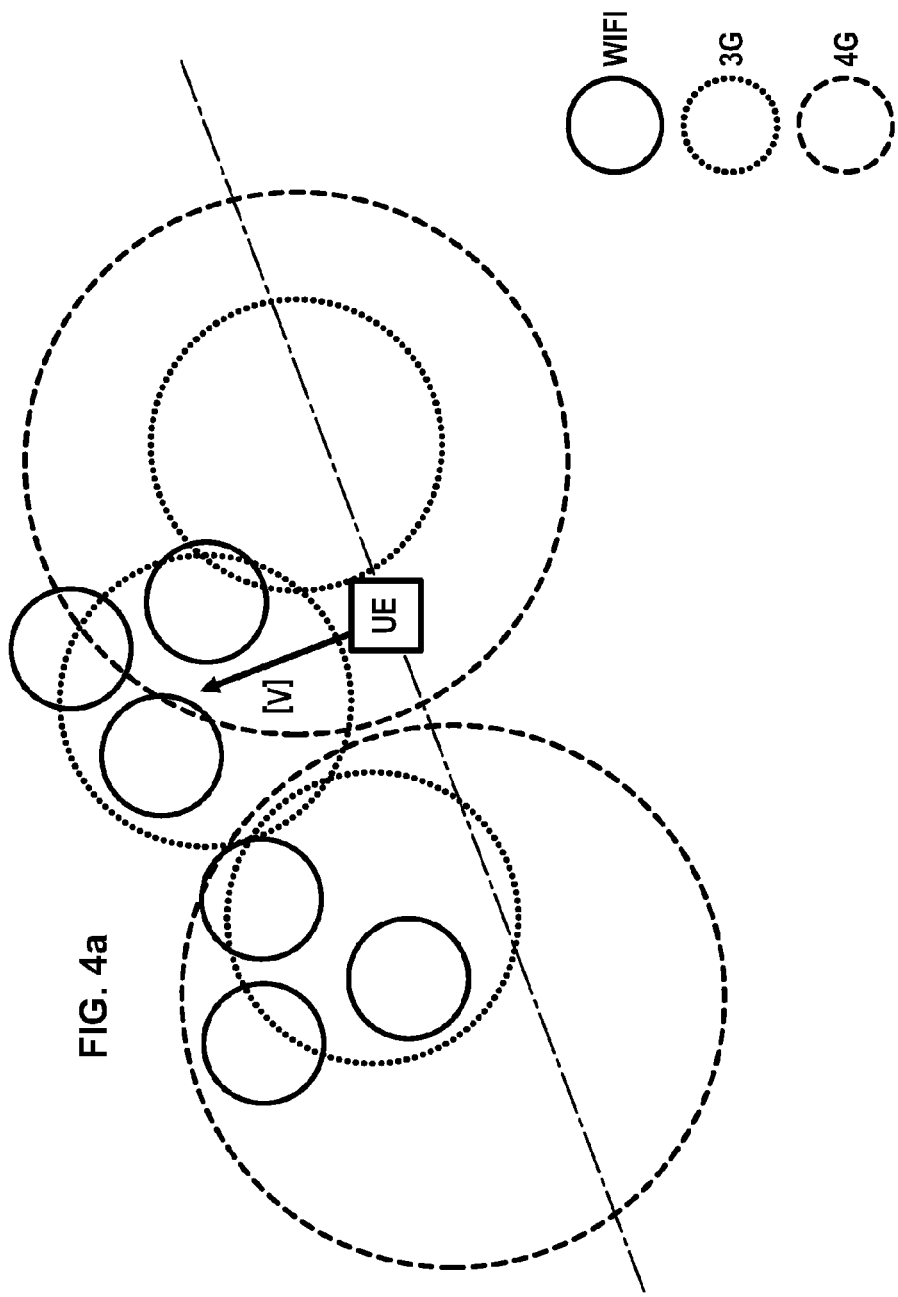
Figure 4B:
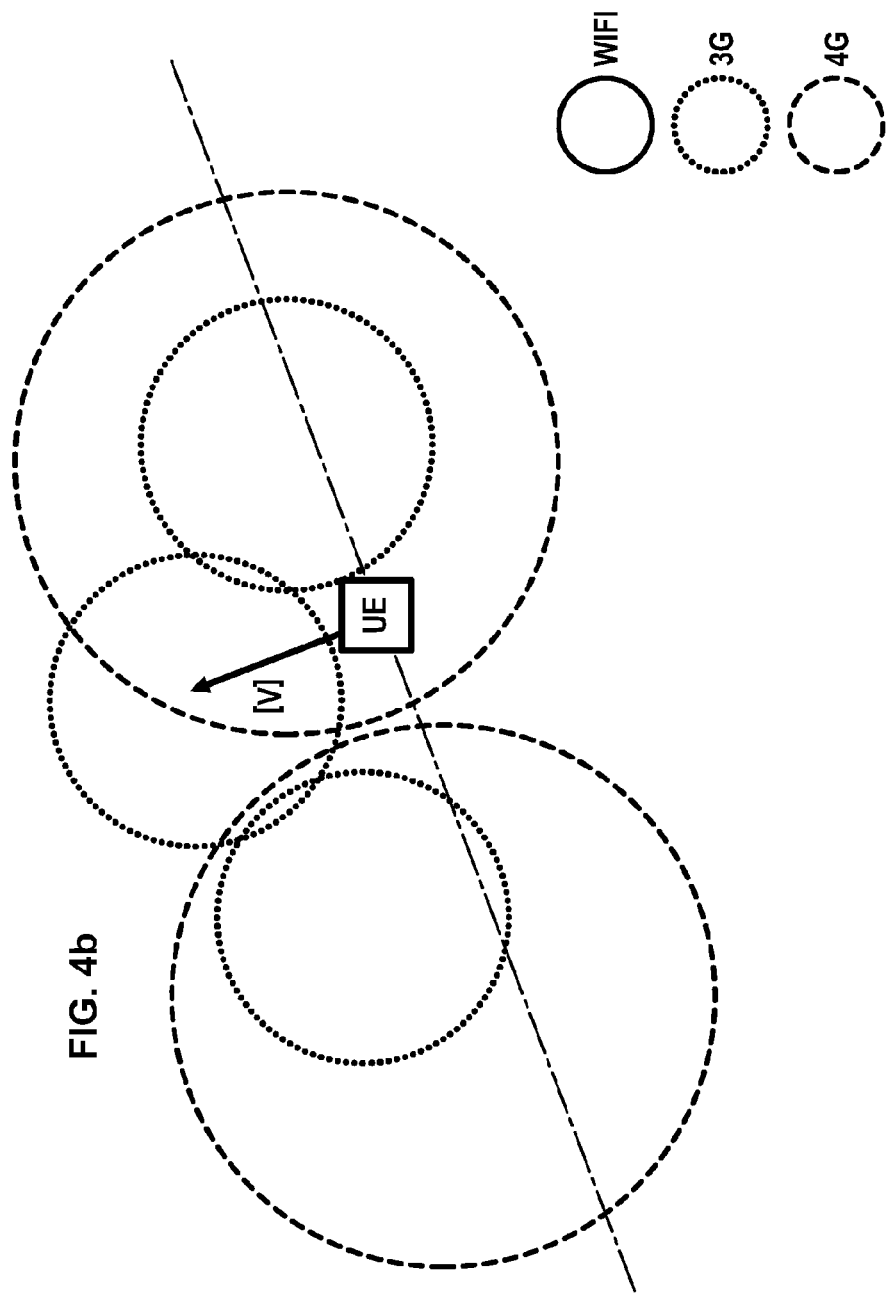

Other characteristics, aims and advantages of the invention will emerge from the following description which is purely illustrative and non-limiting, and which must be considered in conjunction with the appended drawings, in which:

FIG. 1 schematically illustrates a communications network of an operator;

FIG. 2 schematically illustrates deployment of access points of a communications network of an operator;

FIG. 3 illustrates a management method for mobility of a mobile terminal, in a communications network, according to an embodiment of the invention; and FIGS. 4a and 4b illustrate an example of application of the mobility management method according to the present invention.

DETAILED DESCRIPTION OF THE INVENTION

In relation to FIG. 1, a communications network according to the invention is illustrated.

The network comprises several APi access points enabling access to access networks 10 and at least one mobile UE terminal. An access network lets the mobile UE terminal connect to an IP (Internet Protocol) network of Internet type to access services.

An APi access point (i=1, 2, 3) defines a coverage area Zi (i=1, 2, 3) in which the mobile UE terminal is located relative to an access point. These access points are either 3GPP access points, or non-3GPP access points. In the case of a 4G access network, the access points are equipment called "eNodeB". In the case of a 3G access network, the access points are "NodeB". In the case of a 2G or GPRS access network, the access points are BTS (Base Transceiver Station). In the case of a WiFi access network, the access points are "hotspots". Finally, in the case of WIMAX an access network, the access points are base stations.

The network comprises an access point discovery server, designated by ANDSF, which manages a list of access points, a location management gateway (Gateway Mobile Location Center, (GMLC)) and a mutual authentication server (Bootstrap Serving Function, (BSF)).

The ANDSF access point discovery server can be implemented in the form of a server dedicated to this sole functionality of discovery of access points or in the form of a software module installed in a server having other functions in the network, especially a PCRF server in charge of applying certain network policies and invoicing rules.

The ANDSF, GMLC and BSF terminologies are reprised from 3GPP standards and are used hereinbelow, without the invention being limited to the sole entities mentioned in these standards, the invention applying to any network having physical entities having the same functionalities as these entities.

Reference is now made to FIG. 2 which illustrates a mobile terminal UE connected to a current access point (APc) of a communications network of an operator, which comprises several access networks each comprising several AP access points.

Each access point AP defines a coverage area around this access point, illustrated by a circle on this FIG. 2, where the mobile terminal UE has to be to connect to this access point AP. As mentioned in relation to FIG. 1, these AP access points can be of several types and especially 3GPP access points, or non-3GPP access points.

The network shown in FIG. 2 comprises three different types of access point, specifically WiFi access point, "NodeB" stations for 3G and "eNodeB" stations for 4G, in an order growing in size of coverage area associated with these access points.

The mobile terminal UE, connected to the current APc access point of 3G type, accesses a service of an operator of the communications network. This service is available from an access network 3GPP, but can also be from a non-3GPP access network. The current APc access point can be an access point to an access network both non-3GPP and 3GPP.

This mobile terminal UE in this network has several AP access points near its position. In particular, the mobile terminal UE can be located in coverage areas of several AP access points of several types. So, in FIG. 2, the mobile terminal UE is both in the coverage area of the current APc access point of 3G type and in the more extended coverage area of an access point of 4G type.

When it is in mobility status, the mobile terminal UE moves according to a certain direction, at a certain velocity and a certain acceleration, forming a velocity vector [V] and can choose to decide continuing moving from the current APc access point to another access point by means of the mobility management method described hereinbelow using some or all of these parameters.

Reference is now made to FIG. 3 which illustrates a mobility management method of a mobile terminal in a communications network according to an embodiment of the invention.

This method is based especially on using the velocity vector [V] of the mobile terminal UE to select, at the level of an ANDSF access point discovery server, some access point from among all the access points to which this mobile terminal can attach.

This velocity vector [V] is a vector comprising especially:
a velocity component of the mobile terminal, able to be expressed in m/s;
an acceleration component of the mobile terminal, able to be expressed in m/s$^2$;
a direction component of the mobile terminal, able to be expressed by an angle in a given referential;
a location component of the mobile terminal, able to be expressed by coordinates (longitude, latitude).

This velocity vector [V] can be determined by the mobile terminal itself by means of a geolocation module (for example of GPS type), or within the communications network, by means of a location management gateway for mobiles, designated by GMLC gateway (Gateway Mobile Location Center).

According to the 3GPP standard, this GMLC gateway is capable of sending the mobile terminal UE or an application, on request or on notification following subscription, the velocity vector of the mobile terminal UE, which is advantageous especially for terminals having no sophisticated sensors such as GPS sensors. This GMLC gateway is adapted to periodically locate the mobile terminal UE in the communications network or to prevent application when the UE terminal moves.

The GMLC gateway is typically connected to a location server (not shown), designated by LCS server (LoCation Services). According to the standard 3GPP, the LCS server relocates the geographic location of the mobile terminal UE in the communications network. The location information is more precise than that supplied by the mobile terminal UE when it operates without geolocation module GPS. Also, this information is guaranteed, calculated as it is by confidence equipment of the communications network.

In a step S0, the UE terminal is authenticated with the ANDSF access point discovery server, for example by using the procedure described in technical specification TS 33.402 ("UE-ANDSF communication security") allowing the ANDSF server to retrieve security information between the mobile terminal UE and the ANDSF server, as well as rules for defining access, which could be used by the UE terminal as a function of its subscription profile and its preference (see technical specification TS 23.402, section 4.8.2.1).

This authentication comprises sending (step S00) the ANDSF server an identifier from the mobile terminal UE.

The ANDSF server verifies with the mutual authentication BSF server that the user has the right to obtain a list of access points as a function of its location, by sending it (step S01) the identifier of the mobile terminal UE.

This BSF server comprises a database comprising all the information relative to users subscribed to the network as well as the security parameters of the user, letting this subscribed user authenticate the ANDSF server and the letting the ANDSF server authenticate the UE terminal and secure the link between these two entities. Such information is retrieved in advance from an HSS server (not shown) during prior generic authentication between the mobile terminal UE and the HSS server via the BSF server (see specification TS 23.222). The BSF server sends back in response to the ANDSF server information relative to the user, then the ANDSF server sends (step S03) the mobile terminal UE the information according to which it is authenticated with the ANDSF server.

Apart from authentication of the mobile terminal UE, the ANDSF server can also be authenticated (step S02) with the GMLC gateway during this authentication phase.

During a first step S1, the ANDSF access point discovery server retrieves the velocity vector [V] from the mobile terminal UE, either from the mobile terminal UE when the latter is capable of determining it, or from the GMLC gateway when the latter completes determination of this vector (the latter case being illustrated in FIG. 3), the latter solution being advantageous as it ensures the velocity vector by means of the communications network.

This retrieval step S1 of the velocity vector [V] can especially be initiated by receipt, via the ANDSF access point discovery server, of a request for retrieval of a list of access points from which the mobile terminal UE can connect, sent (step S11) by the mobile terminal UE.

To retrieve this velocity vector [V], the mobile terminal UE sends (step S11) a request for retrieval of this velocity vector to the GMLC gateway, this request comprising an identifier of the mobile terminal to allow the GMLC gateway to find the velocity vector of this mobile terminal in particular.

Following receipt of this request, the GMLC gateway determines this velocity vector optionally by contacting a LCS server to obtain location information of the mobile terminal UE, then inserts this velocity vector in a response message it sends (step S12) in response to the ANDSF access point discovery server.

The request for retrieval of the velocity vector can also take the form of a subscription request from the GMLC gateway so that this gateway notifies the ANDSF server of all the location modifications of the mobile terminal UE, and especially the moves of the user of a mobile terminal UE from one area (embodied for example by a cell identifier CellId, or by a routing area identifier RAI) to another.

Following receipt of the velocity vector [V], the ANDSF access point discovery server can generate (step S2) a list of the access points of the communications network to which the mobile terminal UE can connect, as a function of this velocity vector, and especially by using one or more of the components of this velocity vector.

The list generated by the ANDSF server can consist of an ordered list of the access points of the network, advantageously classified by type of access point, in which the access points are sorted as a function of one or more components of the velocity vector. In this case, the access points appearing first are prioritised relative to the following ones, the mobile terminal UE first aiming to attach to the first access point of the list, then to the second access point in case of failed attachment to the first access point, and so on. Alternatively, the list generated by the ANDSF server can contain only some of the access points selected as a function of one or more components of the velocity vector.

So, in a first case, the access points of the list are sorted in this list as a function of the velocity component of the mobile terminal to propose as a priority to the mobile terminal in mobility status the access points which are compatible with its displacement velocity. Alternatively, the list can comprise only those access points selected as a function of this velocity component to prevent the terminal from trying to connect to an access point which is not compatible with its displacement velocity.

For this to happen, thresholds of maximal velocity are associated respectively with the access points of the network, as a function of their belonging to a certain category of access point. In other words, a first maximal velocity threshold (for example 30 km/h) is associated with the access points of WiFi type, a second maximal velocity threshold (for example 50 km/h) is associated with the access points of Wimax type, a third maximal velocity threshold (for example 100 km/h) is associated with the access points of 3G type, etc., these thresholds of maximal velocity representing the maximal velocity of the mobile terminal compatible with the category of the access point in question.

In this case, the access point associated with a maximal velocity threshold greater than the velocity component of the mobile terminal are sorted by priority, in the list of access points generated by the ANDSF access point discovery server, relative to the access points associated with a maximal velocity threshold less than this velocity component. Alternatively, only those access point associated with a maximal velocity threshold greater than the velocity component of the mobile terminal are kept in the list generated by the ANDSF server.

Therefore, reprising the abovementioned threshold values, if the value of the velocity component of the mobile terminal is 80 km/h, the access point Wifi and Wimax are either sorted by the lowest priority in the list of access points generated by the ANDSF server relative to the 3G, 4G access points, or excluded from this list by the ANDSF server which keeps these 3G, 4G access points only. In other words, when the velocity of the mobile terminal is high and this mobile terminal is connected to an access network 3GPP, mobility to a non-3GPP access network is not preferred, as this type of access network does not support high velocities.

In another case, the access point of the list are sorted in this list as a function of the acceleration component of the mobile terminal to propose as a priority to the mobile terminal in mobility status access points compatible with acceleration of the mobile terminal. Alternatively, the list can comprise only those access points selected as a function of this acceleration component to prevent the terminal from trying to connect to an access point which is not compatible with its acceleration.

By way of example, substantial acceleration of the mobile terminal is indicative of vehicular motion of the user of the mobile terminal, for which it is preferred to propose as a priority 3G or 4G access points relative to access points of WiFi type. The application of this acceleration criterion can be similar to application of the velocity criterion described earlier, by allocating maximal acceleration thresholds as a function of the category of access point and by comparing these thresholds to the value of the acceleration component of the velocity vector to prioritize the access points in the list.

In another case, the access points of the list are sorted in this list as a function of the displacement component of the mobile terminal to propose as a priority to the mobile terminal in mobility status only those access points located on the predictable path of the mobile terminal. Alternatively, the list can comprise only access points selected as a function of this displacement component to prevent the terminal from trying to connect to an access point which is not in a geographic area to which it points. This can be done by prioritizing the access points of the communications network located in a geographic area contained in a sector of more or less N degrees (N being of the order of 10°, for example) relative to the direction of displacement, by taking the position of the mobile terminal as a reference point, relative to the access point located outside such a sector.

Of course, the method is not limited to use of a single one of the components of the velocity vector to select the access point, but can use any combination of the different components of this velocity vector to then select these access point according to accumulated several criteria, as will be obvious later on.

Once generated, the list of access points is then sent in a message (step S3) to the mobile terminal UE which updates (step S4) the list of access points already stored in its memory, by replacing them by the new list supplied by the ANDSF server.

So, when the mobile terminal is in mobile status and seeks a new access point to connect to, it can select a new access point in the list of access points it has saved, this list being optimised to take into account the velocity and/or direction of displacement of the mobile terminal UE.

Reference is now made to FIGS. 4a and 4b which illustrate an example of application of the mobility management method according to the present invention. These figures repeat the network illustrated in FIG. 2, in which the mobile terminal UE moves with a certain velocity vector [V].

First, it is considered that the ANDSF server performs prioritizing of access point as a function of the displacement component of the velocity vector [V] by selecting the access points located in a sector of [−90°; +900] relative to the direction of displacement of the mobile terminal UE, by taking up the position of the mobile terminal UE as origin. The coverage areas of the access point selected in this way are shown in FIG. 4a.

Second, it is considered that the ANDSF server performs additional prioritizing of access points as a function of a velocity component of the mobile terminal UE, here of the order of 80 km/h, which excludes the Wifi access point. The coverage areas of the access points selected with this other criterion, apart from the displacement criterion, are shown in FIG. 4b.

The list of access points is ordered such that the access point whereof the coverage areas are illustrated in FIG. 4b are sorted by priority relative to the other access points appearing in FIG. 4a, in turn sorted by priority relative to the other access points appearing in FIG. 2. This list is then sent via the ANDSF server to the mobile terminal, which can select a fresh access point in this ordered list, in an optimised manner since it prefers attachment to access points located in the right direction and compatible with the velocity of the mobile terminal.

The invention is not limited to the method described hereinabove, but also relates to a mobility management system of a mobile terminal comprising an ANDSF access point discovery server, adapted to supply a mobile terminal UE with a list of access points of a communications network to which the mobile terminal can connect, and a mobile location gateway GMLC capable of determining a velocity vector of the mobile terminal UE.

The mobile location gateway GMLC is configured to send a message comprising the velocity vector to the ANDSF access point discovery server, following receipt of a request for retrieval of the velocity vector coming from the ANDSF access point discovery server.

The ANDSF access point discovery server is configured to generate the list of access points as a function of the velocity vector received of the mobile location gateway (GMLC).

For its part, the mobile UE terminal comprises a selection module configured to select one or more access points in the list of access points received from the ANDSF access point discovery server, generated as a function of the velocity vector of this mobile terminal. This selection module can take the form of a computer program executed by the processor of the mobile terminal UE. In an embodiment where the mobile terminal UE itself supplies its velocity vector, the mobile terminal further comprises a geolocation module (e.g. a module GPS) configured to determine the velocity vector of the mobile terminal, which is sent to the ANDSF access point discovery server by an emission module (e.g. a data interface transmission coupled to an antenna) of the mobile terminal UE.

Also, the invention relates to a computer program product comprising code instructions for execution of the method described above, when the latter is executed by a processor.

The invention claimed is:

1. A management method for mobility of a mobile terminal in a communications network comprising a plurality of access points with several types of access networks, said types of access networks comprising 3GPP and non-3GPP access networks, and an access point discovery server configured to supply the mobile terminal with a single list of the access points of the network to which the mobile terminal can connect, the method comprising:
    retrieving, by the access point discovery server, a velocity vector of the mobile terminal; and
    generating, by the access point discovery server, the single list of the access points ordered by type of access point as a function of said velocity vector.

2. The method according to claim 1, wherein the velocity vector is retrieved from a location management gateway and sent via said gateway to the access point discovery server, following receipt, by the location management gateway, of a request for retrieval sent by the access point discovery server.

3. The method according to claim 2, wherein at least part of the velocity vector is obtained by the location management gateway from a location server configured to locate the mobile terminal in the communications network.

4. The method according to claim 1, wherein the velocity vector is determined by the mobile terminal via a geolocation module of the mobile terminal and sent via said mobile terminal to the access point discovery server.

5. The method according to claim 1, wherein the velocity vector comprises a velocity component of the mobile terminal and wherein the access point discovery server generates the single list of access points as a function of said velocity component of the mobile terminal.

6. The method according to claim 5, wherein thresholds of maximal velocity are associated respectively with said access points as a function of their belonging to a category of access point and wherein the access points associated with a maximal velocity threshold less than the velocity component of the mobile terminal are excluded from the single list generated by the access point discovery server.

7. The method according to claim 1, wherein the velocity vector comprises an acceleration component of the mobile terminal and wherein the access point discovery server generates the single list of access points as a function of said acceleration component of the mobile terminal.

8. The method according to claim 1, wherein the velocity vector comprises a displacement component and wherein the access point discovery server generates the single list of access points as a function of said displacement component.

9. The method according to claim 1, further comprising sending the single list of access points to the mobile terminal and storing said single list in a memory of the mobile terminal.

10. The method according to claim 1, wherein the access point discovery server, respectively the location management gateway, is a server.

11. The method of claim 1, wherein the server is a gateway utilizing the 3GPP standard.

12. An access point discovery server configured to send to a mobile terminal a single list of access points of a communications network with several types of access networks to which the mobile terminal can connect, said types of access networks comprising 3GPP and non-3GPP access networks, said server being configured to obtain a velocity vector of the mobile terminal and generate the single list of access points ordered by type of access point as a function of said velocity vector.

13. A mobile terminal configured to select an access point in a communications network with several types of access networks, said types of access networks comprising 3GPP and non-3GPP access networks, said mobile terminal being configured to select said access point from a single list of access points received from an access point discovery server of said communications network, said single list of access points ordered by type of access point being generated as a function of a velocity vector of the mobile terminal retrieved by said access point discovery server.

14. The mobile terminal according to claim 13, wherein said mobile terminal is further configured to determine the velocity vector of the mobile terminal and to transmit said velocity vector to said access point discovery server.

15. A management system for mobility of a mobile terminal comprising an access point discovery server, configured to supply to a mobile terminal a single list of access points of a communications network with several types of access networks, said types of access networks comprising 3GPP and non-3GPP access networks, to which the mobile terminal can connect, and a mobile location gateway configured to determine a velocity vector of the mobile terminal,
    the mobile location gateway being configured to send a message comprising the velocity vector to the access point discovery server, following receipt of a request for retrieval of the velocity vector coming from the access point discovery server; and
    the access point discovery server being configured to generate the single list of access points ordered by type of access point as a function of the velocity vector received from the mobile location gateway.

16. A non-transitory computer-readable medium having stored thereon instructions for executing a management method for mobility of a mobile terminal in a communications network comprising a plurality of access points with several types of access networks, said types of access networks comprising 3GPP and non-3GPP access networks, and an access point discovery configured to supply the mobile terminal with a single list of the access points of the network to which the mobile terminal can connect when said instructions are executed by a processor, wherein said method comprises:
- retrieving, by the access point discovery server, a velocity vector of the mobile terminal; and
- generating, by the access point discovery server, the single list of the access points ordered by type of access point as a function of said velocity vector.

* * * * *